(12) United States Patent
Boese et al.

(10) Patent No.: US 7,664,542 B2
(45) Date of Patent: Feb. 16, 2010

(54) REGISTERING INTRA-OPERATIVE IMAGE DATA SETS WITH PRE-OPERATIVE 3D IMAGE DATA SETS ON THE BASIS OF OPTICAL SURFACE EXTRACTION

(75) Inventors: Jan Boese, Eckental (DE); Martin Kleen, Furth (DE); Klaus Klingenbeck-Regn, Nürnberg (DE); Marcus Pfister, Bubenreuth (DE); Norbert Rahn, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 538 days.

(21) Appl. No.: 11/496,069

(22) Filed: Jul. 28, 2006

(65) Prior Publication Data

US 2007/0238952 A1 Oct. 11, 2007

(30) Foreign Application Priority Data

Jul. 29, 2005 (DE) ........................ 10 2005 036 322

(51) Int. Cl.
*A61B 5/05* (2006.01)
*A61B 6/00* (2006.01)
(52) U.S. Cl. .................... 600/411; 600/427; 600/476
(58) Field of Classification Search .................. None
See application file for complete search history.

(56) References Cited

U.S. PATENT DOCUMENTS

| 6,782,287 | B2* | 8/2004 | Grzeszczuk et al. | 600/424 |
|---|---|---|---|---|
| 7,546,156 | B2* | 6/2009 | Madden et al. | 600/476 |
| 2005/0148859 | A1* | 7/2005 | Miga et al. | 600/410 |
| 2006/0082590 | A1* | 4/2006 | Stevick et al. | 345/587 |

FOREIGN PATENT DOCUMENTS

DE 197 57 772 A1 7/1999

OTHER PUBLICATIONS

E. Grimson, M. Leventon, G. Ettinger, A. Chabrerie, F. Ozlen, S. Nakajima, H. Atsumi, R. Kikinis, and P. Black; "Clinical Experience with a High Precision Image-guided Neurosurgery System"; Computer Science; Oct. 1998; pp. 1-11; Proc. MICCAI '98.
Stephan A. Schruender, Hendrik Fuchs, Saso Spasovski, Andreas Dankert, "Intraoperative Corneal Topography for Image Registration", Journal of Refractive Surgery, Sep./Oct. 2002, pp. S624-S629, vol. 18.

* cited by examiner

*Primary Examiner*—Long V Le
*Assistant Examiner*—Angela M Hoffa

(57) ABSTRACT

The invention relates to a method for registering intra-operative image data set with pre-operative 3D image data set, including:
spatially calibrating an optical 3D sensor system with an intra-operative imaging modality,
intra-operatively detecting the surface of an examination area of interest with the 3D sensor system to produce an intra-operative surface mask,
intra-operatively recording the area of interest for examination with the intra-operative modality at least partly containing the intra-operative surface mask to obtain an intra-operative image data set,
computing the same surface from the pre-operative 3D image data set containing the detected surface to obtain a pre-operative surface mask,
registering the intra-operative and pre-operative surface mask with each other,
determining a mapping specification between pre-operative 3D image data set and intra-operative image data set based on the calibration and the registration, and
overlaying the intra-operative image data set with the pre-operative 3D data set based on the mapping specification.

10 Claims, 5 Drawing Sheets

Fusion: Functional image (PET) and
Morphological image (CT)

REGISTERING INTRA-OPERATIVE IMAGE DATA SETS WITH PRE-OPERATIVE 3D IMAGE DATA SETS ON THE BASIS OF OPTICAL SURFACE EXTRACTION

CROSS REFERENCE TO RELATED APPLICATIONS

This application claims priority of German application No. 10 2005 036 322.9 filed Jul. 29, 2005, which is incorporated by reference herein in its entirety.

FIELD OF THE INVENTION

The present invention relates to a method for infra-operative registration of intra-operative image data sets with pre-operative 3D image data sets. In this regard the present invention relates especially to a method which is based on rapid optical surface recognition.

BACKGROUND OF THE INVENTION

In medical imaging a (frequent) problem which occurs is that of having to rapidly yet still precisely register intra-operative image data sets with pre-operative 3D image data sets; there being various reasons for this:

1. Intra-operative image data sets which are obtained as so-called real-time images during an intervention, usually with the aid of fluoroscopic imaging, are primarily used for navigation of surgical instruments (e.g. in the head or the heart). These types of fluoroscopic 2D images (recorded with a C-arm for example) are rapidly available, the imaging technology minimizes the radiation dosage for patient and doctor. Interventional equipment (operation instruments, catheters, guide wires etc.) are shown as high-resolution images almost in real time. However such fluoroscopy images—compared to images of 3D imaging modalities (e.g. CT, MRT, 3D angio)—do not show any spatial details. In the prior art the spatial information has been recovered by registering 3D images (for example from a CT, 3D angio or MR tomography) recorded pre-operatively with two-dimensional intra-operative radiological images and underlaid with these images, a process which is also referred to as co-registration. With this type of registration the direction from which a 3D volume must be projected so that it can be brought into alignment with the intra-operative 2D image must be determined.

2. Intra-operative image data sets can also be functional nuclear-medical 3D image data (e.g. PET or SPECT images) which supply a description of metabolic functions or processes of the body. One of the uses of such image data is to visualize anatomical regions which exhibit an abnormal metabolism, such as tumors for example, and to determine their size and activity. However these functional 3D images provide little information about the patient's anatomy in which the pathogenic region (e.g. the tumor) is embedded, which is a problem when such functional image data is used exclusively in respect of diagnostics, therapy planning and therapy, especially since the spatial resolution of this image data is greatly limited. It is therefore difficult to localize a tumor exactly solely using nuclear-medical 3D image data (SPECT, PET), since the exact spatial relationship to the patient anatomy is missing from this data. However this spatial relationship can also be re-established by registration (and fusion) of the functional 3D image data with high-resolution morphological 3D image data.

The problem from the medical technology standpoint—with 2D radiological images just as with 3D images—lies in the registration with the high-resolution morphological 3D images. There are various approaches to this problem in the prior art, which are based for example on user interaction (setting of landmarks in both images) or for example on minimizing the differences in intensity.

In particular the problem of the registration of functional 3D image data with morphological 3D image data is currently resolved in different ways A) The so-called "Multi-Modality 3D-3D registration" combines complementary information which was generated by different imaging modalities. Thus for example anatomical information from CT, MR, C-arm rotation angiography or 3D ultrasound image data can be combined with functional information of fMRI, PET, SPECT image data or of functional mapping modalities such as EEG or MEG.

B) Functional and morphological image data can (also) be fused with the aid of landmark-based (feature-based) or image-based registration algorithms, with a software implementation of specific algorithms being used as the basis in this case.

Such a software-based registration only operates reliably if enough common image information is available as regards functional and morphological image data, which is not always the case. Although the performance of this software registration is satisfactory as a rule for diagnostic applications, an improvement would be desirable however. It should also be mentioned that the accuracy of the individual registration results in the individual case cannot be quantitatively recorded but mostly only assessed visually since the actual desired result is not known in advance.

C) To ameliorate the problem of approach B) and to achieve improvements with regard to the imaging clinical workflow, combinations of anatomical imaging modalities and functional imaging modalities have since been made commercially available: e.g. the "CT-PET Biograph system" or the "CT-SPECT Symbia system" from Siemens.

In general the problem of registration or the overlaid representation (fusion) of anatomical and functional 3D image data is considerably simplified by such a modality combination. However the costs of providing a modality combination are extremely high and in addition it is not currently possible to obtain combinations which are more subject to failure but are still sensible and desired (e.g. PET+MRT, SPECT+MRT, ultrasound doppler+MRT, MEG+MRT etc.).

The disadvantage of the existing method is on the one hand a certain imprecision which is not to be tolerated and on the other hand the high time overhead sometimes involved in these methods. It is namely desirable for these methods to be able to react as exactly and quickly as possible to any patient movements. Exact and fast registration, especially of functional with morphological 3D image data, turns out to be extremely difficult in practice however since only a small number of common factors exist between these two complementary image data categories.

A method is disclosed in "Clinical Experience with a High Precision Image-guided Neurosurgery system" by E. Grimson, M. Leventon, G. Ettinger, A. Chabrerie, F. Ozlen, S. Nakajima, H. Atsumi, R. Kikinis, P. Black, Lecture Notes in Computer Science (Springer), Proc. MICCAI'98; October 1998, pages 63ff in which, using laser scanners (laser on stepping motor in combination with a video camera) a surface area of the object to be examined is determined which is used as a basis of a registration between a pre-operative image containing this surface area and an interoperative 2D or 3D image data set at least partly containing this area. However the scan duration of a laser scan is specified as around 30 seconds which makes the method susceptible to movement artifacts and it is unsuitable in particular for series of functional recordings or rapid instrument tracking.

SUMMARY OF THE INVENTION

The object of the present invention is to further improve the registration of intra-operative fluoroscopic or functional image data with pre-operative morphological 3D image data.

This object is achieved in accordance with the present invention by the features of the independent claims. The dependent claims develop the central ideas of the invention in an especially advantageous manner.

In accordance with the invention a method is claimed for intra-operative registration of intra-operative image data sets with pre-operative 3D image data sets, featuring the following steps S1: Spatial calibration of an optical 3D sensor system with an intra-operative imaging modality, S2: Intra-operative detection of the surface of an area of interest for examination with the 3D sensor system within one second at a resolution of up to 200 µm by side-on observation of an object to be calibrated by means of a white light projector illuminated with a stripe pattern, with the displacement of the stripes produced during the side-on observation being included for computation of the surface form of the object and intra-operative surface mask being obtained, S3: Intra-operative recording of the area of interest for examination with the intra-operative modality at least partly containing the intra-operative surface mask, through which an intra-operative image data set is obtained, S4: Computing the essentially same surface from a pre-operatively obtained 3D image data set containing the detected or recorded surface, through which a pre-operative surface mask is obtained, S5: Registering the intra-operative and pre-operative surface masks with each other, S6: Determining a mapping specification between pre-operative 3D image data set and intra-operative image data set on the basis of the calibration and the registration and S7: Overlaid visualization of the intra-operative image data set with the pre-operative 3D data set based on the mapping specification.

In this case one possible inventive embodiment of the intra-operative image data set is a 2D fluoro image from an x-ray C-arm and the intra-operative imaging modality is an fMRT device, a PET device, a SPECT device or a functional mapping modality such as an EEG or a MEG.

In a further possible embodiment of the invention the pre-operative 3D image data set originates from a morphological imaging modality in the form of an MRT device, a CT device, a C-arm rotation angiography device or a 3D ultrasound device.

Furthermore the intra-operative detection can be undertaken advantageously shortly before an intra-operative recording or periodically during the intervention.

With periodic detection in particular, in accordance with the invention, on the basis of the measurement results of the optical 3D sensor system, a movement field of the area under examination can be computed which is used to reduce movement artifacts in intra-operative recording or to improve their resolution.

Furthermore a device is claimed which is suitable for executing a method according to one of the previous claims.

BRIEF DESCRIPTION OF THE DRAWINGS

Further advantages, features and characteristics are explained in greater detail on the basis of exemplary embodiments which refer to the accompanying drawings.

DETAILED DESCRIPTION OF THE INVENTION

The present invention describes a method in which optical surface recognition is used to enable the position of the patient to be recorded precisely, rapidly and securely and thus an intra-operative 2D or 3D image data set can be quickly and thereby intra-operatively fused with a pre-operative 3D image data set.

Optical surface recognition is part of the prior art and is offered commercially.

The basis of this technology is an optical 3D sensor system which processes specific images of one or more 3D sensors in a suitable manner. These 3D sensors observe an object to be measured from the side. For measurement the surface of the measurement object is illuminated in accordance with a patentable method by means of white light projector with a pattern of stripes. From the displacement of the stripes produced in this observation from the side the surface form of the object is computed and for example is stored as a three-corner model for subsequent access. The small measurement time and the rapid evaluation delivers within one second a highly accurate form detection of objects of different type and size at a resolution of up to 200 µm.

Figure 1:
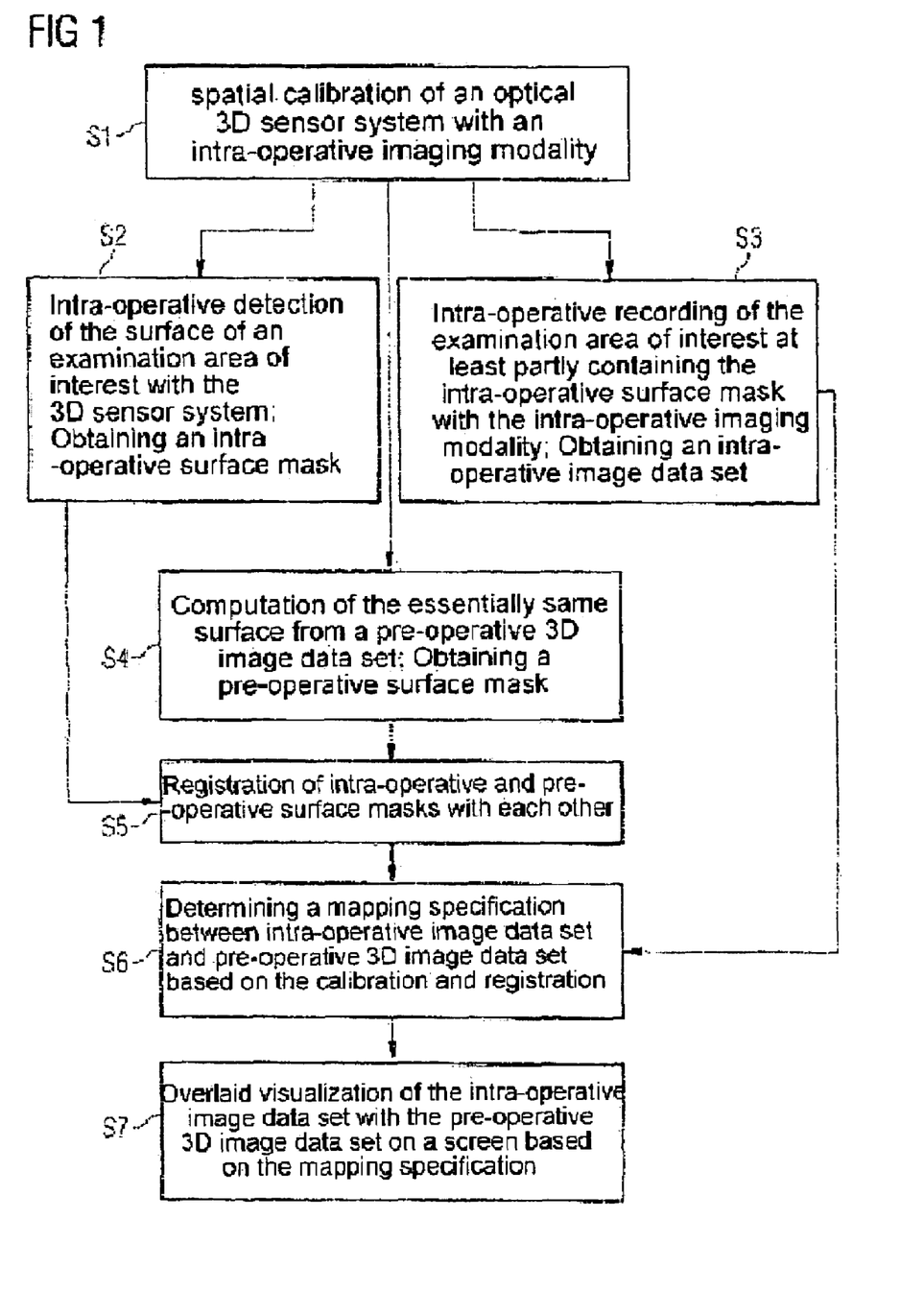
FIG. 1 shows a schematic flow diagram of the inventive method.

The inventive method uses this rapid surface measurement method in order, by contrast with previous methods, to make a more rapid and more exact registration of intra-operative image data sets with pre-operative 3D data sets possible. The inventive method is described below with reference to FIGS. 1 and 2.

The inventive method requires an optical 3D sensor system (as described above), an intra-operative imaging modality (e.g. C-arm, PET, SPECT etc.) and also a pre-operative 3D image data set of a morphological imaging modality (e.g. CT, MRT), which contains the surface of the region of interest to be presented intra-operatively.

Initially the optical 3D sensor system is positioned relative to the intra-operative imaging modality (a C-arm or a PET is referred to below without restricting the general applicability) so that the area of the 3D sensor has a "free field of vision" onto the surface of the examination area of interest and thus the examination area to be registered. With neuro-interventions in the area of the head the surface of the face is an obvious choice so that the 3D sensor is to be attached to the C-arm itself or to the ceiling above the head end of the patient table. In step S1 of the method the optical 3D sensor system is calibrated spatially with the intra-operative system (C-arm), so that the position of the direction of view of the two systems to each other is known. As a result the relationship of the two co-ordinate systems (co-ordinate source of the co-ordinate system of the optical 3D sensor system with the co-ordinate source of the co-ordinate system of the intra-operative system) is known through this step of one-off calibration, which is symbolized in FIG. 2 by the horizontal connecting line labeled "calibration".

Figure 2:
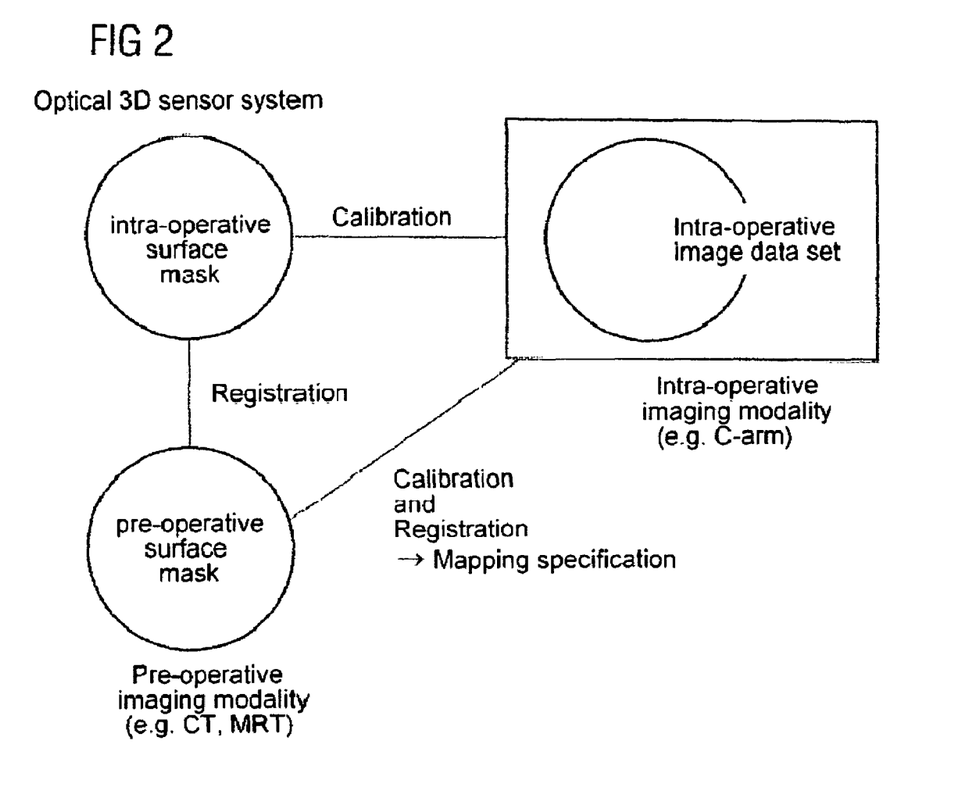
FIG. 2 shows a basic diagram of the inventive method.
Figure 3:
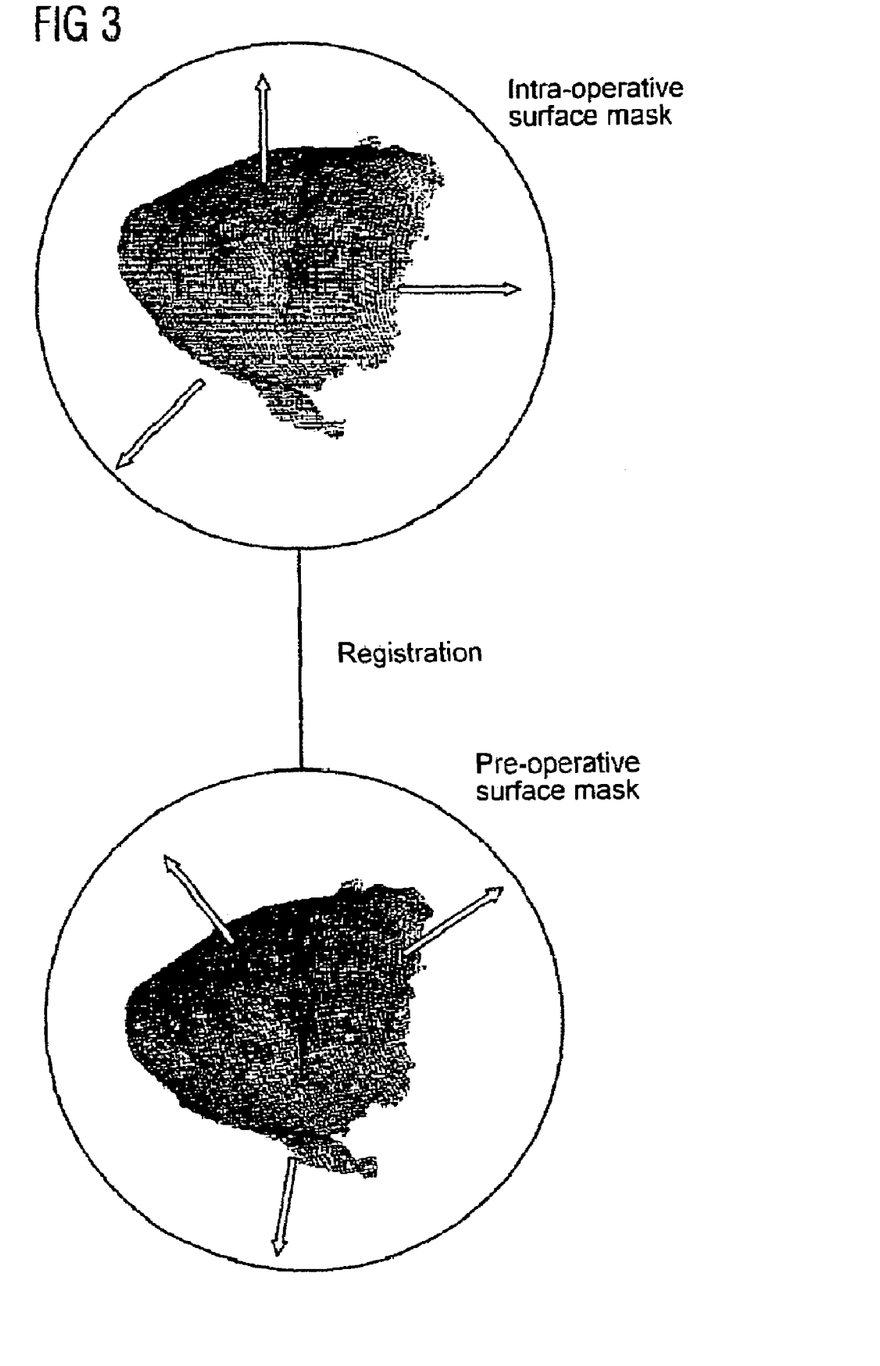
FIG. 3 shows possible surface masks in detail.
Figure 4:
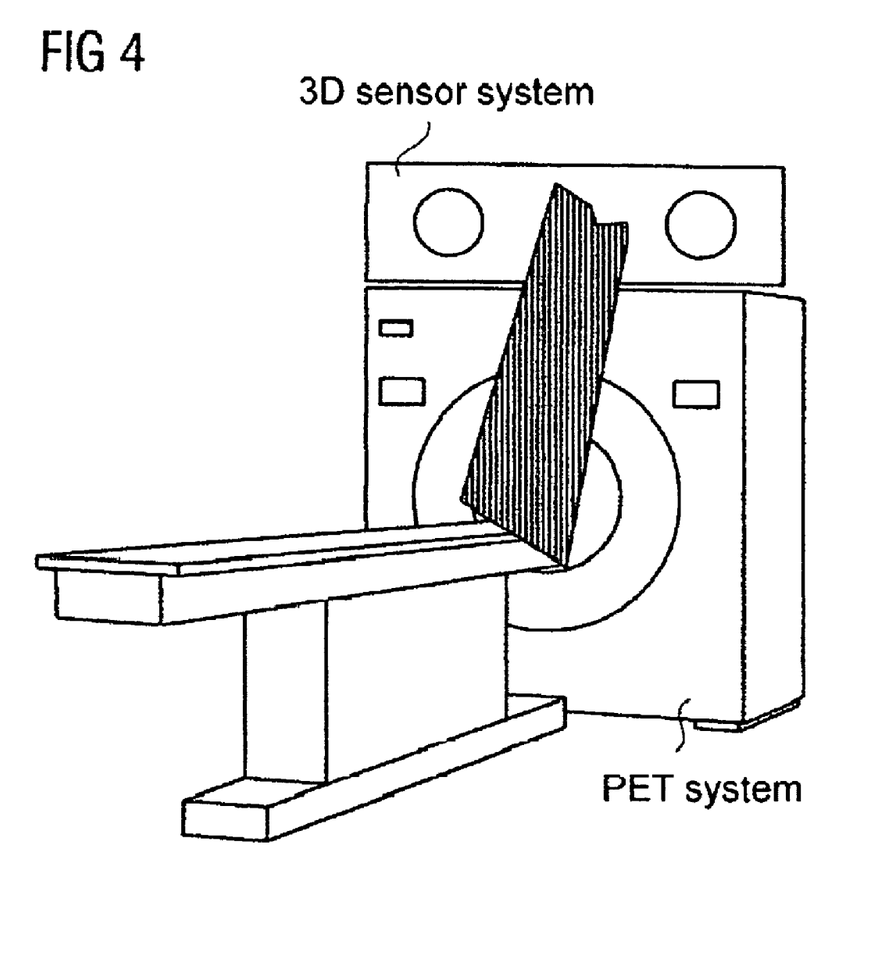
FIG. 4 shows the combination of a PET system with an optical 3D sensor system.
Figure 5:
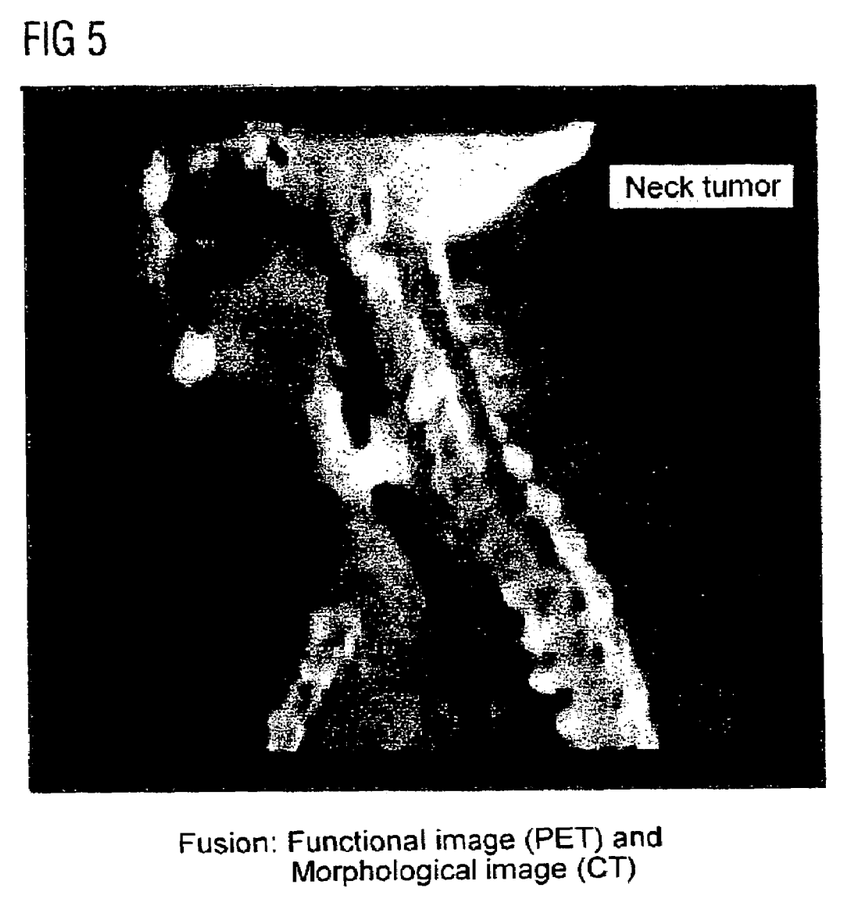
FIG. 5 shows the fusion of a functional image with the morphological image using a neck tumor as an example.

In a second step S2 the surface of the examination area of interest is recorded intra-operatively with the 3D sensor system and is evaluated immediately thereafter, which produces an intra-operative surface mask which is stored as a three-cornered model for example. In FIG. 2 the intra-operative surface mask is symbolized as a circle. A real three-cornered model of a face is shown as an example in FIG. 3.

In a step S3 the examination area of interest at least partly containing the intra-operative surface mask is recorded with the C-arm, which produces an intra-operative image data set which is symbolized in FIG. 2 as a rectangle and at least partly contains the circle (the mask).

In a fourth step S4 essentially the same surface is calculated (extracted purely computationally) from a pre-operative 3D image data set of the examination area of interest, by which a further, this time however a pre-operative surface mask, is obtained, also shown in FIG. 2 by a circle.

Both surface masks are basically very similar (see FIG. 3) since no great change in the surface of the area under examination is to be expected in the period between pre-operative recording and intra-operative recording (maximum of a few days). For this reason, in a fifth step S5, both surface masks can be registered with one another extremely rapidly and with little error tolerance, by contrast with current registration methods which only have a few or artificial landmarks available. The registration is symbolized in FIG. 2 by the vertical connecting line between the two masks.

Since the structure of the two masks, but especially that of intra-operative mask in which the intra-operative image data set is at least partly contained (symbolized by the part circle contained in a rectangle), on the basis of the calibration and the registration a mapping specification can be determined in a step S6, specifying how the pre-operative image must be rotated and shifted to enable it to be brought into alignment with the intra-operative image (symbolized by the diagonal connecting line in FIG. 2). On the basis of this mapping specification the relevant area of the pre-operative 3D image data set can finally be overlaid with the intra-operative image data set and visualized jointly with this on a screen in a step S7.

It should be noted that the order of the steps S2, S3 and S4 of the method can be interchanged, which has been symbolized in FIG. 2 by an arrangement of the method steps on one level. Thus for example the extraction of the surface of the pre-operative 3D image data set can be undertaken so to speak "offline" even before the optical intra-operative detection and also before the intra-operative recording.

The optical measurement (step S2) can be undertaken either always shortly before the execution of an Intra-operative recording and/or periodically during the intervention. If the surface of the examination area is detected with the aid of the optical 3D sensor system during the examination with an intra-operative functional imaging modality (PET or SPECT) periodically or even continuously, a possible movement of the examination area relative to the PET or SPECT gantry can be detected and what is known as a movement field (movement sequence relating to the examination area) can be computed. Since nuclear-medical investigation methods such as PET and SPECT are associated with a relatively long acquisition time of typically a few minutes (PET) up to more than 20 minutes (SPECT), movement artifacts in the PET and SPECT imaging are produced relatively frequently or the resolution of PET and SPECT is reduced because of image blurring caused by patient movement.

The movement field determined with the aid of the optical 3D sensor system can be used in a further embodiment of the inventive method to correct the faulty local resolution of (metabolic) events caused by patient movements, in order to reduce or improve the resolution of movement artifacts in PET and SPECT images.

In this case there are different options with regard to the spatial arrangement of the optical 3D sensor system relative to the intra-operative imaging modality, especially of the 3D sensor itself, to which the spatial calibration in accordance with step S1 must be adapted in each case.

If a fixed spatial relationship exists between the co-ordinate system of the optical 3D sensor and the co-ordinate system of the intra-operative imaging modality, for example by the 3D sensor being rigidly connected to the intra-operative imaging modality or by the optical 3D sensor being mounted at a fixed location in the operating theatre (e.g. on the ceiling) it is sufficient to only undertake the calibration once (e.g. during or after the installation). Possible changes, e.g. turning of the 3D sensor in its anchorage can be fed back via rotation sensors, after which an automatic update of the spatial relationship of the two co-ordinate systems to each other can be undertaken.

If a basically flexible arrangement of the 3D sensor in relation to the intra-operative imaging modalities exists, for example by the 3D sensor being mounted within the operating theatre on a mobile stand (similar to an infusion stand) so that it can be freely moved, or by both systems being mobile, the calibration of the spatial relationship of the two systems can be undertaken by means of positioning and/or orientation sensors which are mounted both on the 3D sensor and also on the intra-operative imaging modality in order in this way to allow the determination of the position and the location of the two systems to each other.

In summary the present invention consists of a method for improved intra-operative registration of intra-operative 2D fluoro images or functional 3D images with (morphological) 3D image data sets, whereby an optical 3D sensor system is used for 3D surface measurement of the examination area, the spatial relationship between the co-ordinate system of the optical 3D sensor system and the intra-operative imaging modality is known through calibration and where necessary through use of position sensors, and whereby the computed (extracted) surface mask of the (morphological) pre-operative 3D images is registered with the surface mask of the examination area (surface-based) detected by means of optical 3D sensors.

After calibration and registration the following combinations of presentation can be implemented:

a) 2D fluoro image+morphological 3D image b) functional 3D image+morphological 3D image c) intra-operative surface mask+functional 3D image.

In the case of a representation of functional focuses of a PET or SPECT examination (for example by color-coded metabolisms) jointly with the (as for example transparently represented) optically recorded surface of the examination area (combination c)), although the user does not obtain any mapping of the functional focuses relative to the exact anatomy, they are still obtained relative to a surface representation of the examination area. Thus the common visualization of surface and functional 3D images can be of assistance for the anatomical assessment of lesions near the surface (e.g. bone tumors).

In addition this type of visualization can be used for planning minimally-invasive entries for needle biopsy procedures or for the introduction of trocars in gastro enterology.

The invention claimed is:

1. A method for registering an intra-operative image data set with a pre-operative 3D image data set for a medical examination, comprising:
   providing a pre-operative 3D image data set for a medical examination, said data set including information descriptive of a surface along a feature of a patient such that an image of the surface is obtainable from the data set;
   obtaining a pre-operative surface mask for the surface from the pre-operative 3D image data set;
   positioning an optical 3D sensor system to provide a side view of the surface of the feature;
   calibrating the optical 3D sensor system with respect to an intra-operative imaging modality;
   illuminating the surface with a light pattern such that the side view of the illuminated surface indicates displacement of lines in the pattern along the feature;
   detecting an area of interest including the illuminated surface of the feature with the optical 3D sensor system and obtaining an intra-operative surface mask of the feature based on data acquired with the optical 3D sensor system;
   recording the area of interest with the intra-operative imaging modality at least partly containing the intra-operative surface mask to obtain the intra-operative image data set;
   registering the intra-operative surface mask with the pre-operative surface mask;
   determining a mapping specification between the intra-operative image data set and the pre-operative 3D image data set based on the calibration of the optical 3D sensor system with the intra-operative imaging modality and the registration of the intra-operative surface mask with the pre-operative surface mask; and
   overlaying the intra-operative image data set with the pre-operative 3D data set based on the mapping specification.

2. The method as claimed in claim 1, wherein the intra-operative image data set is a 2D fluoroscopic image of an x-ray C-arm.

3. The method as claimed in claim 1, wherein the intra-operative imaging modality is selected from the group consisting of: an fMRT device, a PET device, a SPECT device, and a functional mapping modality.

4. The method as claimed in claim 3, wherein the functional mapping modality is taken from the group consisting of an EEG and an MEG.

5. The method as claimed in claim 1, wherein the pre-operative 3D image data set originates from a morphological imaging modality selected from the group consisting of: an MRT device, a CT device, a C-arm rotation angiography device, and a 3D ultrasound device.

6. The method as claimed in claim 1, wherein the step of detecting is undertaken by illuminating and observing the surface of the area of interest via a white light projector providing a pattern of stripes on the surface, and features of the surface are computed based on displacement of the stripes as viewed in the side view.

7. The method as claimed in claim 6, wherein the detection is undertaken within one second at a resolution of up to 200 μm.

8. The method as claimed in claim 7, wherein the detection is undertaken before the intra-operative recording or periodically during the intra-operative recording.

9. The method as claimed in claim 1, wherein a movement field of the area of interest is computed and used to reduce a movement artifact in the intra-operative recording or to improve a resolution of the recording.

10. A method for registering an intra-operative image data set with a pre-operative 3D image data set for a medical examination, comprising:
   calibrating an optical 3D sensor system with respect to an intra-operative imaging modality;
   positioning the optical 3D sensor system to generate a side view of a surface along an area of interest of a patient by illuminating the surface with a light pattern such that the side view of the illuminated surface indicates displacement of lines in the pattern along the area of interest;
   obtaining an intra-operative surface mask corresponding to the surface based on side view data acquired with the optical 3D sensor system wherein the surface mask is generated within one second at a resolution of up to 200 μm via a white light projector illuminated with a pattern of stripes, based on a displacement of the stripes as detected in the side view data;
   recording an image of the surface along the area of interest with the intra-operative imaging modality at least partly containing the intra-operative surface mask to obtain the intra-operative image data set;
   computing another image of the surface along the area of interest from the pre-operative 3D image data set to obtain a pre-operative surface mask;
   registering the intra-operative surface mask with the pre-operative surface mask;
   determining a mapping specification between the intra-operative image data set and the pre-operative 3D image data set based on the calibration of the optical 3D sensor system with the intra-operative imaging modality and the registration of the intra-operative surface mask with the pre-operative surface mask; and
   overlaying the intra-operative image data set with the pre-operative 3D data set based on the mapping specification.

* * * * *

UNITED STATES PATENT AND TRADEMARK OFFICE
CERTIFICATE OF CORRECTION

PATENT NO. : 7,664,542 B2 Page 1 of 1
APPLICATION NO. : 11/496069
DATED : February 16, 2010
INVENTOR(S) : Boese et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this

Thirtieth Day of November, 2010

David J. Kappos
*Director of the United States Patent and Trademark Office*